United States Patent
Suzaki

(10) Patent No.: US 7,440,143 B2
(45) Date of Patent: Oct. 21, 2008

(54) TAMPERING JUDGEMENT SYSTEM, ENCRYPTING SYSTEM FOR JUDGEMENT OF TAMPERING AND TAMPERING JUDGEMENT METHOD

(75) Inventor: Masahiko Suzaki, Saitama (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 926 days.

(21) Appl. No.: 10/303,911

(22) Filed: Nov. 26, 2002

(65) Prior Publication Data

US 2003/0169456 A1 Sep. 11, 2003

(30) Foreign Application Priority Data

Mar. 8, 2002 (JP) .............................. 2002-062934

(51) Int. Cl.
*H04N 1/40* (2006.01)
*G09C 3/00* (2006.01)

(52) U.S. Cl. ........................................ 358/3.28; 380/55

(58) Field of Classification Search ................ 358/3.28, 358/3.27, 464, 452, 453, 474, 538, 539, 527, 358/1.9; 382/190, 100, 198, 165, 176, 135, 382/181, 199, 201, 202, 203, 101, 162, 183, 382/232, 251; 380/281.44, 55, 54, 28, 201, 380/217, 258, 210; 713/165, 170, 175, 176, 713/193, 167, 164, 168, 190, 161, 150, 340
See application file for complete search history.

(56) References Cited

U.S. PATENT DOCUMENTS

| 5,948,103 | A  | * | 9/1999  | Fukuzaki ..................... 726/27 |
| 6,085,323 | A  | * | 7/2000  | Shimizu et al. .............. 713/150 |
| 6,345,104 | B1 | * | 2/2002  | Rhoads ........................ 382/100 |
| 6,700,990 | B1 | * | 3/2004  | Rhoads ........................ 382/100 |
| 6,813,367 | B1 | * | 11/2004 | Bhattacharjya ............. 382/100 |
| 6,859,545 | B1 | * | 2/2005  | Wu ............................. 382/100 |
| 7,159,117 | B2 | * | 1/2007  | Tanaka ........................ 713/176 |
| 7,159,177 | B2 | * | 1/2007  | Billmaier et al. ............ 715/720 |
| 2002/0051577 | A1 | * | 5/2002 | Kinjo ........................... 382/218 |

FOREIGN PATENT DOCUMENTS

JP 09-154007 6/1997

(Continued)

*Primary Examiner*—King Poon
*Assistant Examiner*—Steven Kau
(74) *Attorney, Agent, or Firm*—Venable LLP; Michael A. Sartori; Catherine M. Voorhees

(57) ABSTRACT

A tampering judgement system is provided which is capable of easily checking whether or not a printed document has been tampered. An image feature information extracting section extracts image feature information from a document image. An image feature information embedding section gives image feature information integrally as original image feature information to a document and a document image output section outputs the information as a printed document. When the printed document is given to the tampering judgement system, the image data is read by a document image reading section. An image feature information extracting section extracts image feature information contained in a document being an object for judgement on tampering. An embedding information extracting section extracts original image feature information from image data. A judging section compares original feature information with image feature information contained in the printed document and if a difference between them exceeds a predetermined threshold value, the document is judged to have been tampered.

4 Claims, 13 Drawing Sheets

FOREIGN PATENT DOCUMENTS

| | | |
|---|---|---|
| JP | 09-179494 | 7/1997 |
| JP | 11-327438 | 11/1999 |
| JP | 2001-078070 | 3/2001 |
| JP | 2001-309157 | 11/2001 |
| JP | 2002-044429 | 2/2002 |

* cited by examiner

Fig.3

| DATE | REMARKS | IN-COMINGS | OUT-GOINGS | BALANCE |
|---|---|---|---|---|
| NOVEMBER | | | | |
| 11.5 | | | 870 | 28,814 |
| 11.5 | | | 870 | 27,944 |
| 11.5 | | | 1,852 | 26,092 |
| 11.10 | | | 1,110 | 24,982 |
| 11.21 | | | 7,000 | 17,982 |
| 11.21 | | | 7,000 | 10,982 |

¥30,000　　　　　¥50,670
¥15,000　　　　　¥5,506
¥18,000
¥9,000

TOTAL　¥72,000　　　　　　　　¥56,176

Fig. 4

| DATE | REMARKS | IN-COMINGS | OUT-GOINGS | BALANCE |
|---|---|---|---|---|
| NOVEMBER | | | | |
| 11.5 | | | 870 | 28,814 |
| 11.5 | | | 870 | 27,944 |
| 11.5 | | | 1,852 | 26,092 |
| 11.10 | | | 1,110 | 24,982 |
| 11.21 | | | 7,000 | 17,982 |
| 11.21 | | | 7,000 | 10,982 |
| | | ¥30,000 | ¥50,670 | |
| | | ¥9,000 | ¥5,506 | |
| | | ¥18,000 | | |
| | | ¥15,000 | | |
| TOTAL | | ¥72,000 | | ¥56,176 |

| DATE | REMARKS | IN-COMINGS | OUT-GOINGS | BALANCE |
|---|---|---|---|---|
| NOVEMBER | | | | |
| 11.5 | | | 870 | 28,814 |
| 11.5 | | | 870 | 27,944 |
| 11.5 | | | 1,852 | 26,092 |
| 11.10 | | | 1,110 | 24,982 |
| 11.21 | | | 7,000 | 17,982 |
| 11.21 | | | 7,000 | 10,982 |

¥30,000
¥15,000　¥50,670
¥18,000　¥5,506
¥9,000

TOTAL　¥72,000　　　　¥56,176

IMAGE FEATURE INFOMATION (PATTERN BLOCK)

Fig.11

| DATE | REMARKS | IN-COMINGS | OUT-GOINGS | BALANCE |
|---|---|---|---|---|
| NOVEMBER | | | | |
| 11.5 | | | 870 | 28,814 |
| 11.5 | | | 870 | 27,944 |
| 11.5 | | | 1,852 | 26,092 |
| 11.10 | | | 1,110 | 24,982 |
| 11.21 | | | 7,000 | 17,982 |
| 11.21 | | | 87,000 | 10,982 |

¥30,000　　¥50,670
¥15,000　　¥5,506
¥18,000
¥9,000

TOTAL　¥72,000　　　　　　　¥56,176

TAMPERED PORTION (pointing to 87,000)

TAMPERING JUDGEMENT SYSTEM, ENCRYPTING SYSTEM FOR JUDGEMENT OF TAMPERING AND TAMPERING JUDGEMENT METHOD

BACKGROUND OF THE INVENTION

1. Field of the Invention

The present invention relates to a tampering judgement system to judge whether or not a document has been tampered and to an encrypting system for the judgement on tampering and to a method for judging on tampering.

2. Description of the Related Art

Conventionally, when security information is stored, together with public information, in a printing media in which an image representing the public information is printed, for example, following methods are available.

(1) "Security Information Storing Method" Disclosed in Japanese Patent Application Laid-Open No. Hei 9-154007

In technology disclosed in this literature, into dotted public information data being dotted by making binary-coded the security information to be stored is embedded binary-coded information data in a unit pixel according to a predetermined encryption key and the resulting data is used as printing data.

(2) "Security Information Storing Method" Disclosed in Japanese Patent Application Laid-Open No. Hei 9-179494

In technology disclosed in this literature, by making security information to be stored binary-coded, by breaking it into blocks and then by making a content of each block decimal-coded, security information blocks B1, B2, B3, and B4 are created. Moreover, reference information data DS1 is prepared which is obtained by making public information image binary-coded and by embedding a code DR1 representing reference points R1 to R4 into the binary-coded public information image. Then, in a state where one or a plurality of security information blocks is arranged so as to be corresponded to the reference point, codes representing position discriminating marks are embedded into the reference information data DS1 in such a manner that position discriminating marks D1 to D4 matching with predetermined contents or with the security information blocks are printed at a place being apart from the reference point marks by one or two dimensional distances matching with contents of a security information block and the resulting data is used as printing data.

When a printed content is a resident card, certificate of a resident seal impression, receipt, or a like and when the printing media is ordinary paper, there is possibly fraud that characters such as a name, address, money amount, date, or a like are erased using an amending liquid or a like and are overwritten with characters with same fonts as used in printing or that characters are added to handwritten characters representing a money amount which is submitted as a formal document. However, an aim of the conventional technology disclosed above is to embed security information into an object to be printed and public information itself cannot be protected. That is, if the object to be printed is tampered, it is difficult to detect such tampering. Moreover, when information to be embedded into an object to be printed is matched to a content of public information or when information to be embedded is associated with a content of public information, checking as to whether or not the content has been tampered is possible, however, a problem occurs that, in order to automatically perform such the checking, a mechanism in which a content of public information can be recognized by a machine such as an OCR (Optical Character Reader) is required on a side of a party making such the checking, which causes a scale of a system to become larger.

SUMMARY OF THE INVENTION

In view of the above, it is an object of the present invention to provide a tampering judgement system to check whether or not public information contained in a document has been tampered and an encrypting system used for the tampering judgement system.

According to a first aspect of the present invention, there is provided a tampering judgement system comprising:

a document image output device having a first image feature information extracting section to extract first image feature information representing features of an image from a document image showing a specified document, an original image feature information adding section to add original image feature information representing the first image feature information extracted from the first image feature information extracting section to the document image, and an output section to output the document image to which the original image feature information has been added; and a tampering judgement device having an original image feature information extracting section to extract the original image feature information from an output document image serving as the document image output by the output section, a second image feature information extracting section to extract second image feature information representing features of the image from the output document image, and a judging section to compare the first image feature information represented by the original image feature information extracted by the original image feature information extracting section with second image feature information extracted by the second image feature information extracting section to judge whether or not the output document image has been tampered based on a result from the comparison.

In the foregoing, a preferable mode is one wherein the judging section contained in the tampering judgement device, if a result from the comparison between the first image feature information represented by the original image feature information and the second image feature information shows that a difference between the first image feature information and the second image feature information exceeds a specified threshold value, judges that the output document image has been tampered.

A preferable mode is one wherein the first image feature information extracting section divides the document image into a plurality of blocks and extracts the first image feature information for every block and wherein the second image feature information extracting section divides the output document image into the plurality of blocks and extracts the second image feature information for every block.

Also, a preferable mode is one wherein the original image feature information serves as information representing the first image feature information in a manner that the first image feature information is able to be optically read.

According to a second aspect of the present invention, there is provided an encrypting system for judging whether or not a content of a specified document has been tampered comprising:

a document image output device having a first image feature information extracting section to extract first image feature information representing features of an image from a document image showing a specified document, a first encryption key generating section to generate first encryption key from the first image feature information, a hidden information encrypting section to encrypt specified hidden information using the first encryption key, an encrypted information adding section to add the encrypted hidden information to the document image, and an output section to output the document image to which the encrypted information has been added; and a decoding device having an encrypted information extracting section to extract the encrypted information from an output document image serving as the document image output by the output section, a second image feature information extracting section to extract second image feature information representing features of an image from the output document image, a second encryption key generating section to generate a second encryption key from the second image feature information, and a decoding section to perform decoding processing on the extracted and encrypted information using the second encryption key.

In the foregoing, a preferable mode is one wherein the first image feature information extracting section divides the document image into a plurality of blocks and extracts the first image feature information for every block and wherein the second image feature information extracting section divides the output document image into the plurality of blocks and extracts the second image feature information for every block.

Also, a preferable mode is one wherein the encrypted information serves as information representing the encrypted hidden information in a manner that the encrypted hidden information is able to be optically read.

According to a third aspect of the present invention, there is provided a method for judging whether or not a document image has been tampered which has a document image outputting device and a tampering judgement device, the method comprising:

a first step of having the document image output device extract first image feature information representing features of an image from a document image representing a specified document, add original image feature information representing the extracted first image feature information to the document image and output the document image to which the original image feature information has been added; and a second step of, after having completed the first step, having the tampering judgement device extract the original image feature information from an output document image serving as the output image, then extract second image feature information representing features of an image from the output document image and compare the first image feature information represented by the extracted original image feature information with the second image feature information and judge, based on a result from the comparison, whether or not the output document image has been tampered.

With the above configuration, whether or not disclosed information contained in a printed document has been tampered can be judged. This prevents unauthorized use of the document caused by tampering of the document. Same effects can be achieved in accordance with a tampering judgement method based on operations of the tampering judgement system of the present invention.

With the above configuration, a control program is provided to have a computer perform operations in accordance with a judgement method of the present invention.

BRIEF DESCRIPTION OF THE DRAWINGS

The above and other objects, advantages, and features of the present invention will be more apparent from the following description taken in conjunction with the accompanying drawings in which:

FIG. 3 is a diagram showing one example of a document image employed in the first embodiment of the present invention;

FIG. 4 is a diagram explaining a state in which the document image has been divided according to the first embodiment of the present invention;

FIG. 11 is a diagram explaining a printed document that has been tampered provided in the first embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
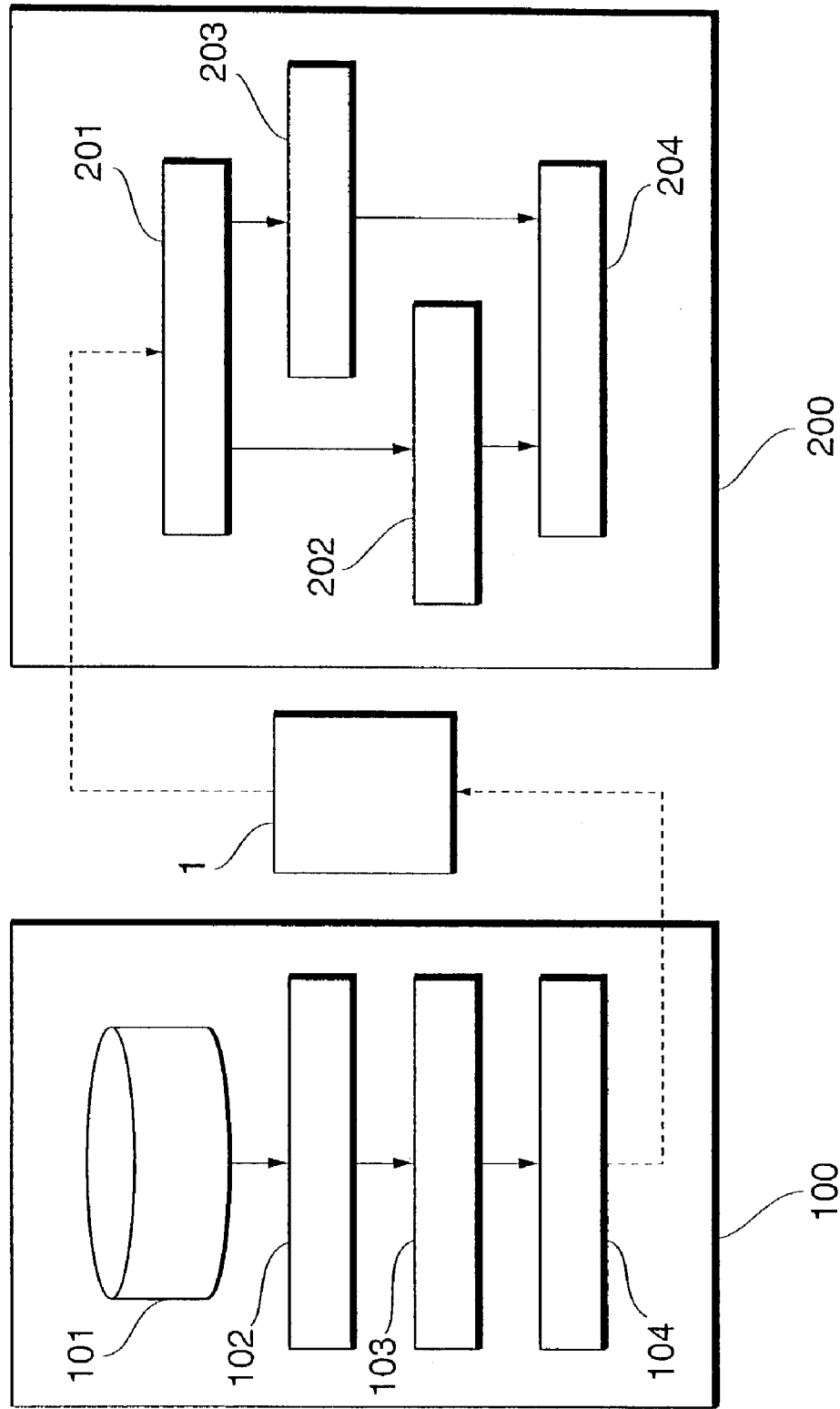
FIG. 1 is a schematic block diagram showing configurations of a tampering judgement system according to a first embodiment of the present invention.

FIG. 1 is a schematic block diagram showing configurations of a tampering judgement system according to a first embodiment of the present invention. As shown in FIG. 1, the tampering judgement system 200 is provided with a document image output device 100 and a tampering judgement device 200. The document/image output device 100 extracts first image featuring information described later from a document image and, based on the extracted image featuring information, adds original image feature information representing legal image information of a document to a document image and outputs the document image. The tampering judgement device 200 extracts second featuring information described later from a document being an object for judgement on tampering such as a printed document 1 as shown in FIG. 1 corresponding to an output document image output from the document/image output device 100 and compares this image featuring information with the original image feature information to judge whether or not the document such as the printed document has been tampered.

The document/image output device 100 is provided with a document image storing section 101, an image featuring information extracting section 102, an image featuring information embedding section 103, and a document image output section 104. The document image storing section 101 is used to store a document image to be printed and output by the document/image output device 100 and a storage device such as a magnetic storing device or a semiconductor memory is employed as the document image storing section 101. The document image being stored in the document image storing section 101 is an image to be printed representing an image of a state printed on paper and its background is made up of a white pixel and a character is made up of a black pixel. The image featuring information extracting section 102 serving as a first image featuring information extracting section, based on a frequency spectrum of a document image described later or a like, extracts the first image featuring information described above. The image featuring information embedding section 103 serving as an original image feature information adding section produces original image feature information representing the first image featuring information extracted by the image featuring information extracting section 102 and embeds it into a document image. More particularly, the image featuring information embedding section 103 converts the first image featuring information into numbers and produces, by having the information to take a form allowing the information to be optically read such as a barcode, original image feature information and embeds the produced original image feature information into a blank portion in a document image. Moreover, the document image is output as document image data. The document image output section 104 has a function of printing document image data created by the image featuring information embedding section 103. The printed document 1 is a document printed and output by the document image output section 104.

The tampering judgement device 200 is provided with a document image reading section 201, an embedded information extracting section 202, an image featuring information extracting section 203, and a judging section 204. The document image reading section 201 optically reads a document image being an object to be judged on tampering and has a function of scanning the read document image and of outputting it as image data and further has a function of making a correction to the read image including a process of rotation of the image or a like and of removing noises from the read image. The embedded information extracting section 202 serving as an original image feature information extracting section allocates image data portion corresponding to the original image feature information from the image data read by the document image reading section 201 and reconstructs original image feature information inserted in a form of a barcode or a like from this portion. The image featuring information extracting section 203 serving as a second image featuring information extracting section is a functional section to extract second image featuring information representing a feature of image data after having erased the original image feature information from image data output by the document image reading section 201 and this function is achieved by the same function as the image featuring information extracting section 102 has. The judging section 204 compares information extracted by the embedded information extracting section 202, that is, original image feature information, with the second image featuring information extracted by the image featuring information extracting section 203 and, based on a result from the comparison, judges whether or not the printed document 1 has been tampered.

Moreover, in the embodiment, the document/image output device 100 and the tampering judgement device 200 described above are realized by a computer, and each of the image featuring information extracting section 102 and the image featuring information embedding section 103 mounted in the document/image output device 100 and each of the document image reading section 201, the image featuring information extracting section 203, the embedded information extracting section 202, and the judging section 204 mounted in the tampering judgement device 200 is made up of software corresponding to each of the components and of a processor to execute the software and hardware such as a memory.

Figure 2:
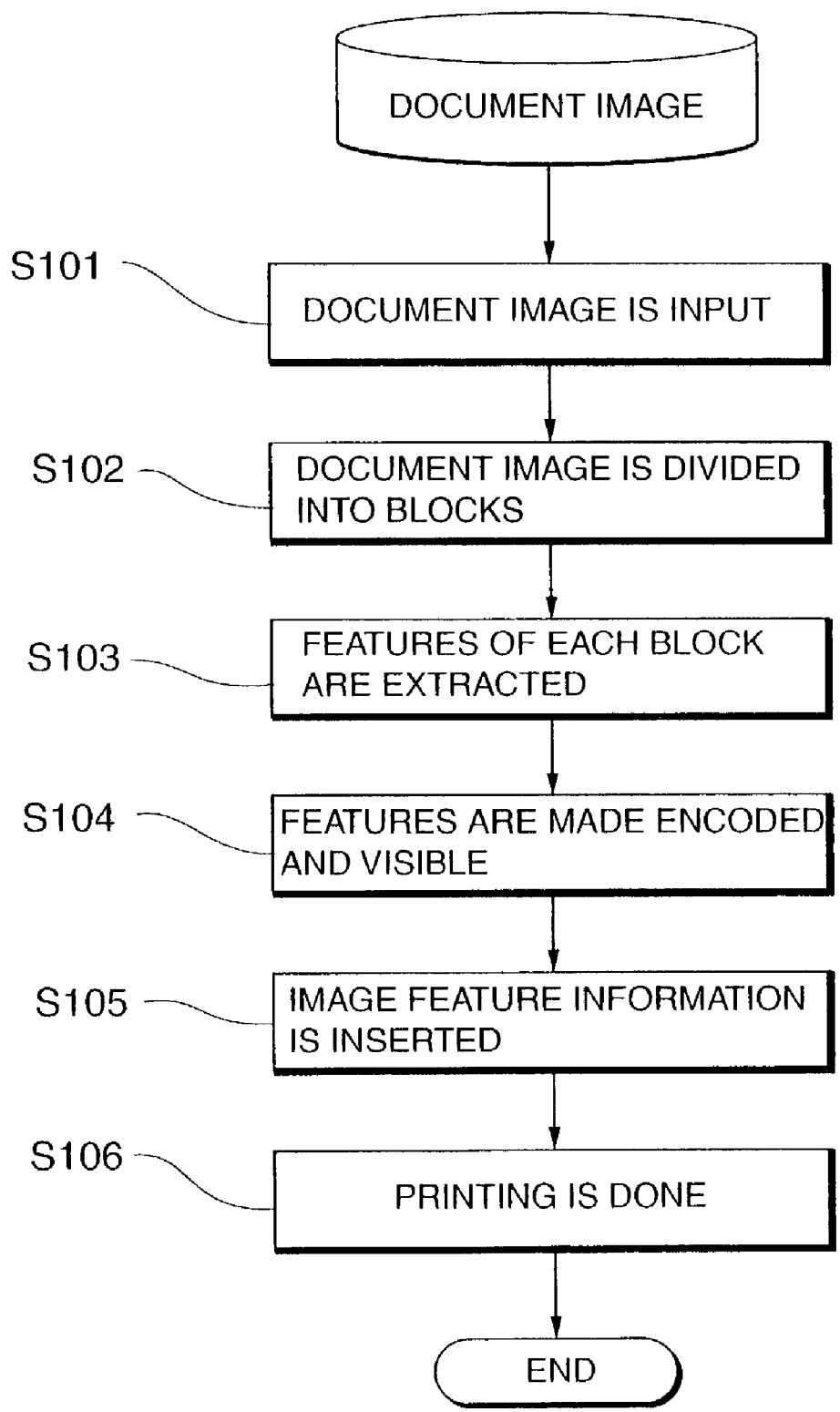
FIG. 2 is a flowchart explaining operations of a document image output device according to the first embodiment of the present invention.

Next, operations of the document/image output device 100 are described by referring to a flowchart shown in FIG. 2. First, a document image being stored in the document image storing section 101 is input in the image featuring information extracting section 102 (Step S101). FIG. 3 is a diagram showing one example of the document image employed in the first embodiment. The image featuring information extracting section 102 divides the document image as shown in FIG. 3 into n-pieces of small block images (Step S102). FIG. 4 is a diagram explaining a state in which the document image has been divided according to the first embodiment. An aim of dividing the document image into a plurality of block images as shown in FIG. 4 is to easily identify and check which portion in the document image has been tampered in a case in which printed documents was tampered and the more the number of divided document images is, the more detailed the identification of a position becomes. Moreover, a size of each of the block images may be fixed or may be changed depending on a place in an image. In the embodiment, the size of each of the block image is fixed.

Next, the image featuring information extracting section 102 extracts a feature of each of block images in the document image (Step S103) and further makes the extracted features in an amount encoded and makes it visible so that it can be printed (Step S104). As a method for extracting features of an image provided in Step S103, for example, a following method is available.

(1) A frequency of a block image is converted and its frequency spectrum is sampled.
(2) Filtering process is performed on a block image by using a band-pass filter, a template having an arbitrary pattern, or a like.
(3) A ratio of an area of a white pixel (background region) and a black pixel (character region) in a block image is calculated.

In the embodiment, a sampled value of a frequency spectrum described above is handled as image feature information.

Figure 5:
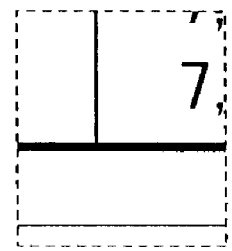
FIG. 5 is a diagram explaining one of divided block images according to the first embodiment of the present invention.
Figure 6:
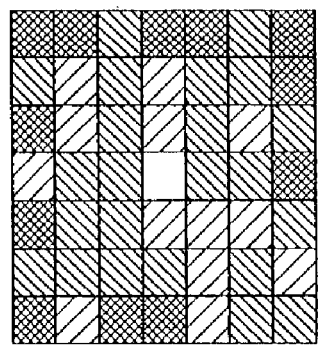
FIG. 6 is a diagram illustrating a result from two-dimensional Fourier Transformation performed on the block shown in FIG. 5 according to the first embodiment of the present invention.

FIG. 5 is a diagram explaining one of divided block images in Step S102. FIG. 6 is a diagram illustrating a result from two-dimensional Fourier Transformation performed on the block shown in FIG. 5. Light and shade shown in FIG. 6 represent a difference between frequency spectrums and the smaller the light and shade are, the larger the value becomes. Moreover, portions positioned in a center of the image represent direct current components and, if portions are positioned nearer to an end of the image, spectrums having higher frequency components occur. In order to make encoded the frequency characteristic represented as above, the image featuring information extracting section 102 converts spectrum values in a specified frequency region shown in FIG. 6 into numbers.

Figure 7:
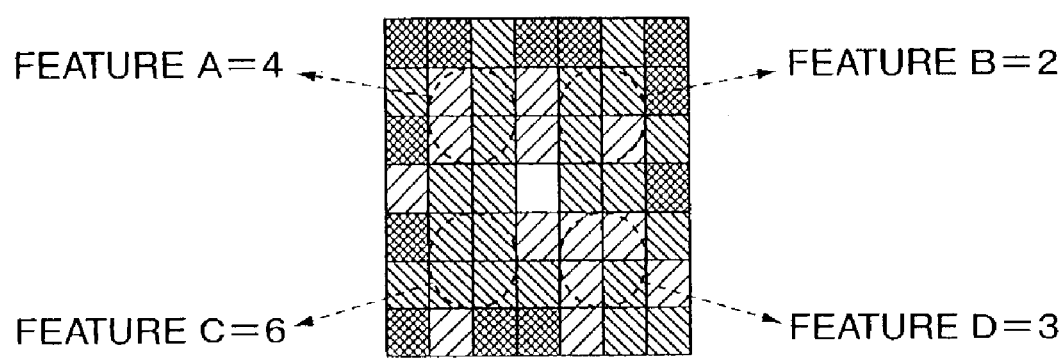
FIG. 7 is a diagram showing one example of selection of a specified frequency region according to the first embodiment of the present invention.

FIG. 7 is a diagram showing one example of selection of the specified frequency region described above. In FIG. 7, a region circled by broken lines represents the specified frequency region and here four frequency regions are selected. The frequency regions to be selected fitly indicate a frequency characteristic provided by a character region in the document image and it is pre-determined that the frequency region being expected to be not easily affected by noise components caused by printing and scanning is selected. The conversion of the frequency spectrums into numbers is performed by quantizing an average spectrum value in corresponding frequency regions. In the example shown in FIG. 7, sampling is made in 8 stages from "0" to "7".

Figure 8:
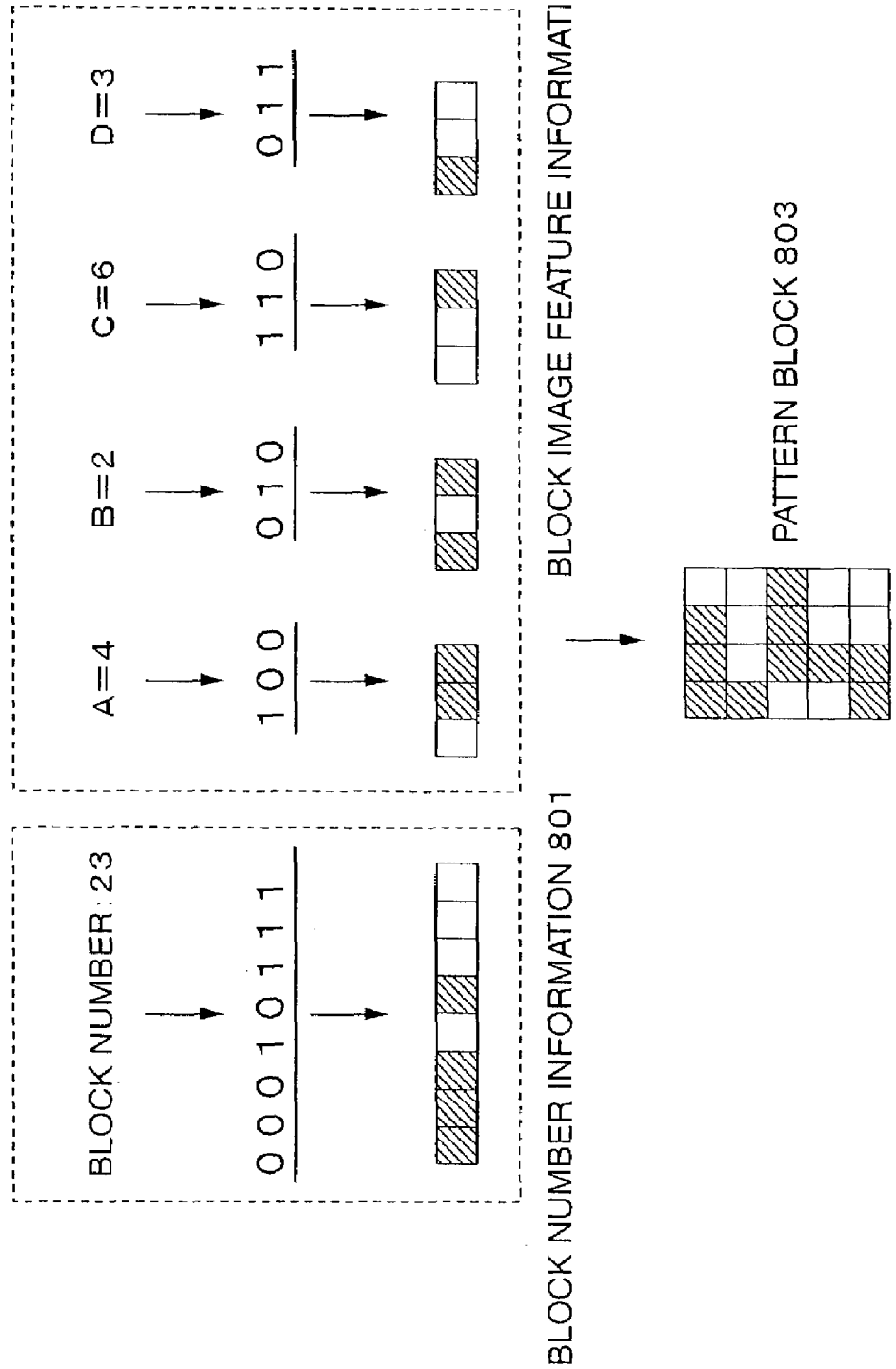
FIG. 8 is a diagram explaining processing of producing a visual pattern from image features of a block according to the first embodiment of the present invention.

FIG. 8 is a diagram explaining a process of producing a visual pattern from image features in the block. By making encoded a number assigned in advance to each block using block number information 801 shown in FIG. 8 and also making encoded the sampled value described above serving as the first image feature information using block image feature information 802 shown in FIG. 8, a visual pattern as shown as the pattern block 803 in FIG. 8 is produced. In FIG. 7, an example is shown in which a block number "23" shown in FIG. 5 is united with the first image feature information "4", "2", "6" and "3" and these are encoded in 20 bits. In the example shown in FIG. 8, each of the image feature information "4", "2", "6", and "3" each being made up of 3 bits is represented in binary and a total number of the bits is given by an equation of 3×4=12 bits. The number "23" being a block number being made up of 8 bits obtained by subtracting the 12 bits from 20 bits is also represented in binary. In the example, a code length is set to be 20 bits, however, it may have an arbitrary value. Moreover, the code may be encrypted or may be compressed by using an arbitrary Hash function. A pattern block 803 shown in FIG. 8 is represented by a matrix made up of 5 lines and 4 columns by uniting the block number information 801 with block image feature information 802. Out of 2 elements contained in the matrix, a deep pattern denotes "0" and a light pattern denotes "1". Moreover, when a visual pattern is produced, not only a pattern block may be represented by a matrix described above but also may be represented by a general bar code.

Next, by referring to FIG. 2, pattern blocks for all block images created in Step S104 is inserted by the image featuring information embedding section 103 into a document image (Step S105). Then, the document image into which the pattern blocks have been inserted are printed by the document image output section 104 (Step S106).

Figure 9:
FIG. 9 is a diagram showing an example of a printed document employed in the first embodiment.

FIG. 9 is a diagram showing an example of a printed document employed in the first embodiment. The pattern block serving as original image feature information is, as shown in FIG. 9, inserted into a background region, that is, a region where no character exists in the document image.

Figure 10:
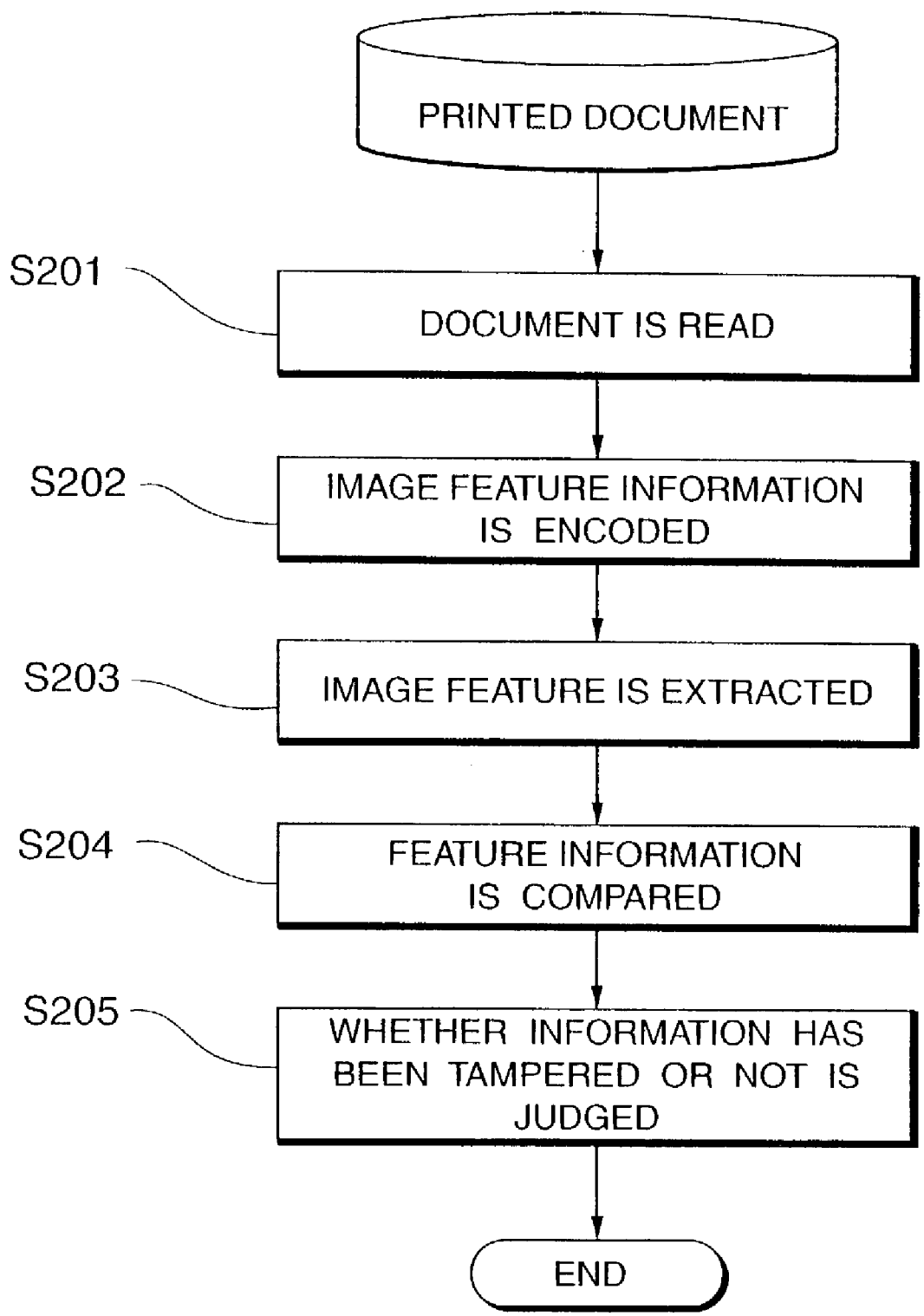
FIG. 10 is a flowchart showing operations of a tampering judgement system according to the first embodiment of the present invention.

Next, operations of the tampering judgement system 200 are described by referring to a flowchart shown in FIG. 10. The tampering judgement system 200 first reads a document to be judged such as the printed document 1 by using the document image reading section 201 and stores the document, as image data, in a memory of a computer (Step S201). Moreover, the document image reading section 201 performs processes of making a correction by a way of revolution, enlarging and reducing of the image data, and removing noises or a like. The embedded information extracting section 202 allocates a portion corresponding to a pattern block from the image data and decodes a feature of each block image in the pattern block (Step S202). That is, the embedded information extracting section 202, by performing creating processes carried out by the image featuring information extracting section 102 described above in retrograde order, decodes the feature of each of block images.

The image featuring information extracting section 203, in order to extract features of an image from image data contained in the printed document 1, masks image data portion corresponding to a pattern block by a portion of a background region and by performing same processes as those in Step S102 and S103 on the image having undergone the masking, and extracts second image feature information (Step S203). Next, a judging section 204 compares embedded information extracted by the embedded information extracting section 202, that is, first image feature information shown by the pattern block with second image feature information obtained by the image featuring information extracting section 203 for every block (Step S204) and makes a tampering judgement on whether a difference between these values falls within a pre-determined range (Step S205).

Figure 12:
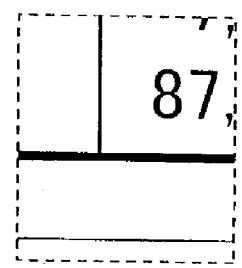
FIG. 12 is a diagram explaining a block corresponding to a tampered portion provided in the first embodiment of the present invention.
Figure 13:
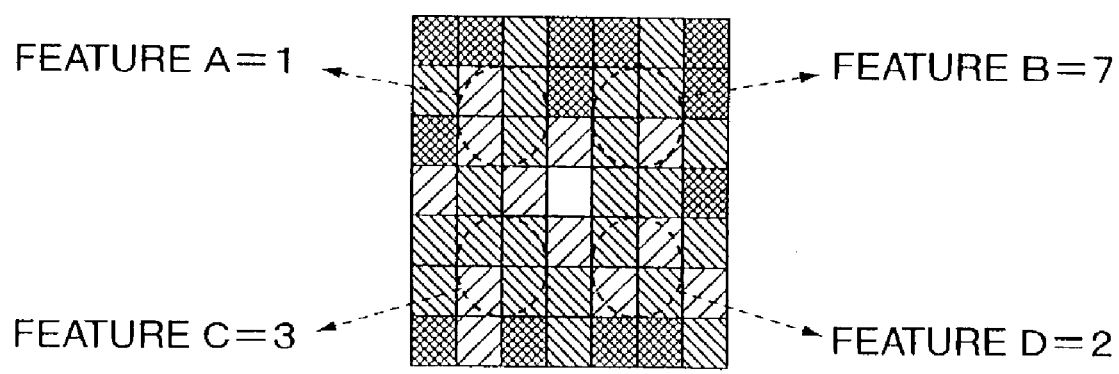
FIG. 13 is a diagram explaining a result from extracting image features of the block corresponding to the tampered portion provided in the first embodiment of the present invention.

The above-mentioned judgement on tampering by the tampering judgement system 200 is described in detail. FIG. 11 is a diagram explaining a printed document 1 that has been tampered provided in the first embodiment. FIG. 12 is a diagram explaining a block corresponding to a tampered portion provided in the first embodiment. FIG. 13 is a diagram explaining a result from extraction of image features of the block corresponding to the tampered portion provided in the first embodiment. In the embodiment, let it be assumed that the printed document 1 has been tampered in a way as shown in FIG. 11. The block shown in FIG. 12 corresponding to the tampered portion corresponds to the block shown in FIG. 5. Moreover, the FIG. 13 corresponds to FIG. 7.

In the tampering judgement system 200, values $P(N, A)$, $P(N, B)$, $P(N, C)$, and $P(N, D)$ are assigned as each value of image features A to D for the block number N for each of the pattern blocks encoded by the embedded information extracting section 202, that is, for each of the pattern blocks representing original image feature information and $Q(N, A)$, $Q(N, B)$, $Q(N, C)$, and $Q(N, D)$ are assigned as each value of image features A to D for the block number N extracted by the image featuring information extracting section 203. Moreover, a differential $D(N)$ in an amount of features between block images having same number is defined, for example, as $D(N) = ABS(P(N, A), Q(N, A)) + ABS(P(N, B), Q(N, B)) + ABS(P(N, C), Q(N, C)) + ABS(P(N, D), Q(N, D))$. Here, $ABS(X, Y)$ represents an absolute value of a differential between X and Y In the embodiment, it is understood from FIG. 7 that $P(N, A)=4$, $P(N, B)=2$, $P(N, C)=6$, and $P(N, D)=3$. Moreover, it is understood that $Q(N, A)=1$, $Q(N, B)=7$, $Q(N, C)=3$, and $Q(N, D)=2$. Therefore, $D(N)=|4-1|+|2-7|+|6-3|+|3-2|=12$. When the judgement on tampering is made, a threshold T for the judgement is pre-determined, and if $D(N)$ is larger than T, a block of the block number N is judged to have been tampered.

According to the tampering judgement system of the first embodiment 1, since printing is done in a manner that features of a justifiable document image are embedded in a document, whether or not disclosed information itself contained in the printed document has been tampered is judged. Moreover, whether or not a document has been tampered can be judged without performing a process of recognizing contents of a document by using an OCR (Optical Character Reader) or a like, thus being able to avoid introduction of a large scale system. Furthermore, since the document image is divided into a plurality of blocks, a position in which the document has been tampered can be easily identified and, by selecting a number of divided documents as appropriate, accuracy of identifying the position of the tampering can be freely calibrated.

Second Embodiment

In an encryption system of a second embodiment of the present invention, image feature information contained in the document image is used as an encryption key by which specified hidden information is encrypted and the encrypted information is embedded into a document image.

Figure 14:
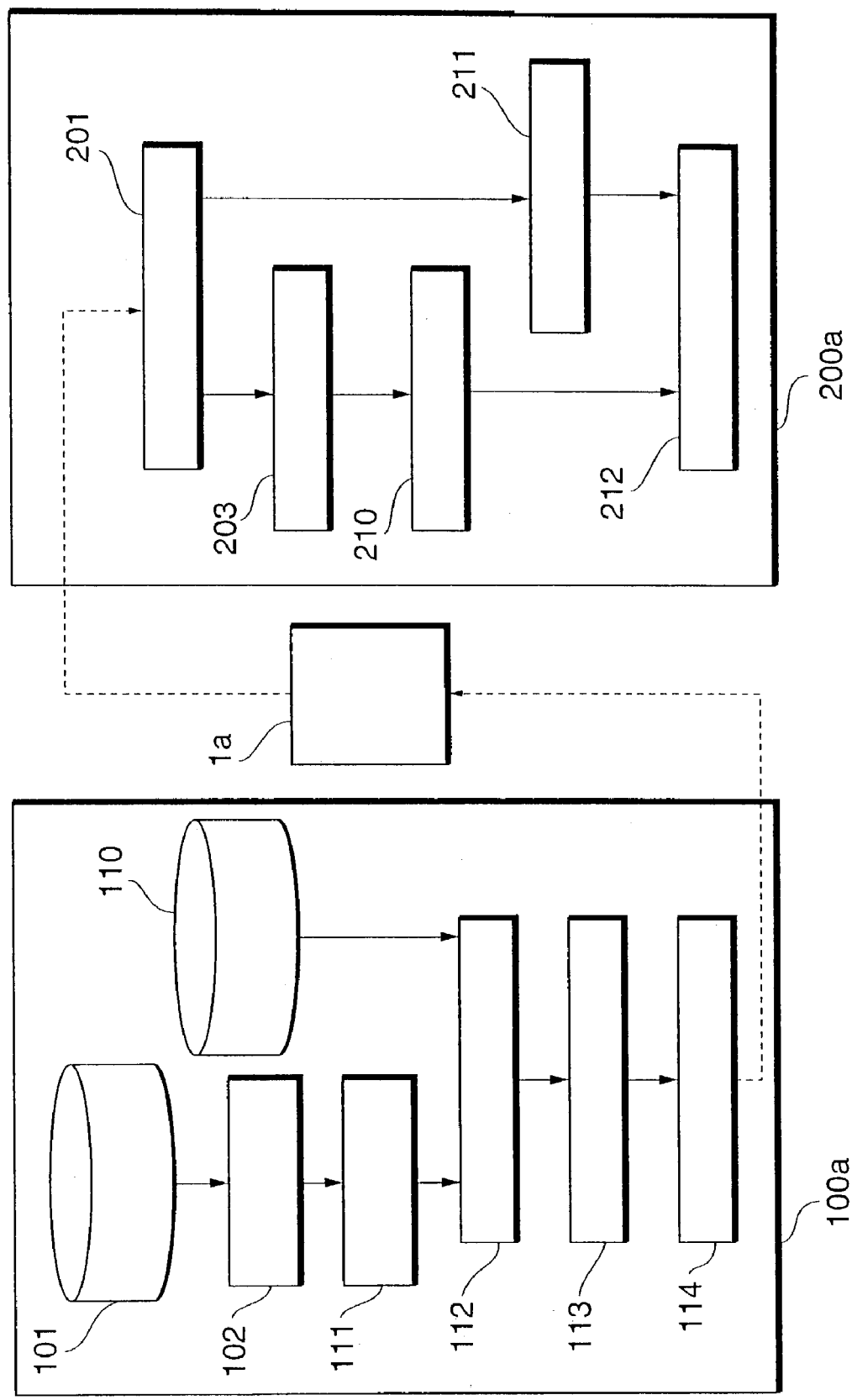
FIG. 14 is a schematic block diagram showing configurations of a tampering judgement system according to a second embodiment of the present invention.

FIG. 14 is a schematic block diagram showing configurations of a tampering judgement system of the second embodiment of the present invention. As shown in FIG. 14, the tampering judgement system of the second embodiment is provided with a document image output device 100a and a tampering judgement device 200a. The document/image output device 100a is made up of a document image storing section 101, an image feature information extracting section 102, a hidden information storing section 110, an encryption key generating section 111, a hidden information encrypting section 112, a cryptograph block embedding section 113, and a document image output section 114. The document image storing section 101 and the image feature information extracting section 102 have same functions as those in the first embodiment. The hidden information storing section 110 is used to store hidden information to be given to the printed document 1 to be output from the document image output device 100a after the printed document has been encrypted and is achieved in a form of a storage device such as a magnetic storing device, a semiconductor memory or a like. In the embodiment, signed information is used as hidden information. The encryption key generating section 111 generates first encryption key from first image feature information extracted by the image feature information extracting section 102. The hidden information encrypting section 112, by using the first encryption key generated by the encryption key generating section 111, encrypts specified information for the hidden information storing section 110. The cryptograph block embedding section 113 serving as an encrypted information addition unit generates encrypted information representing hidden information encrypted by the encryption key generating section 111 and embeds the generated encrypted information into a document image. The document image output section 114 has a function of printing and outputting document image data that has been embedded by the cryptograph block embedding section 113.

The tampering judgement device 200a is provided with a document image reading section 201, an image feature information extracting section 203, an encryption key generating section 210, an encryption information extracting section 211, and a hidden information decoding section 212. Configurations of the document image reading section 201 and the image feature information extracting section 203 are same as those in the first embodiment and their descriptions are omitted accordingly. The encryption key generating section 210 serving as a second encryption key generating section generates a second encryption key from second image feature information extracted by the image feature information extracting section 203. Configurations of the encryption key generating section 210 has same functions as those of the encryption key generating section 111 in the document/image output device 100a employed when the encryption key is generated. The encryption information extracting section 211 allocates data portion corresponding to encrypted information representing encrypted hidden information from image data produced through reading processes performed by the document image reading section 201 and reconstructs the encrypted information from the allocated data portion. The hidden information decoding section 212 performs decoding process on encrypted information using the second encryption key generated by the encryption key generating section 210. In the tampering judgement system 200a, as described above, encrypted information is encoded by the second encryption key produced based on the printed document 1a to be an object of the encryption judgement. Therefore, if the document 1a has not been tampered, the hidden information given to the document 1a is decoded properly and correctly. The encryption system of the second embodiment is a system adapted to judge whether or not a document has been tampered based on principles described above.

Figure 15:
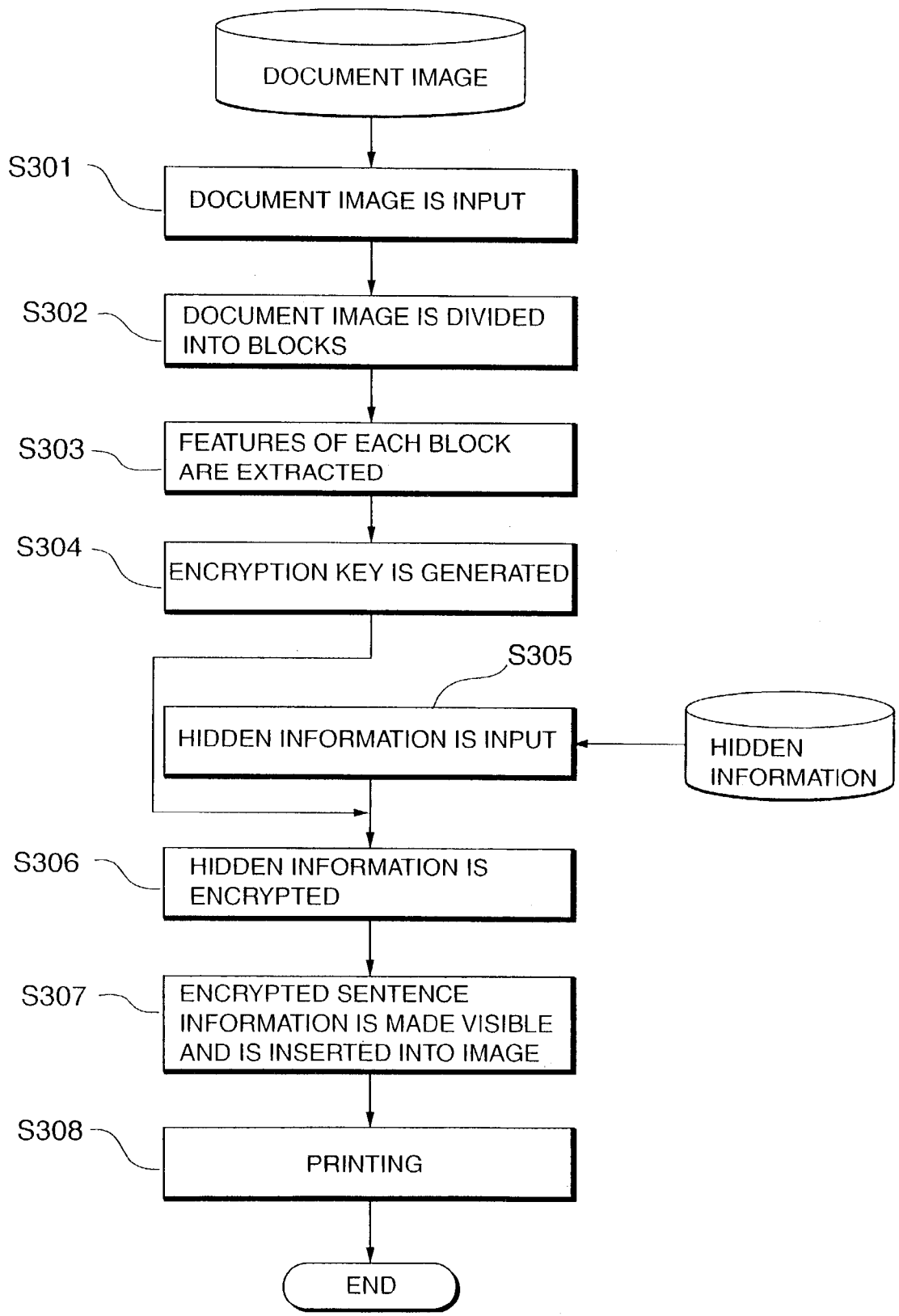
FIG. 15 is a flowchart showing operations of the document/image output device according to the second embodiment of the present invention.

Next, operations of the document/image output device 100a of the second embodiment are described by referring to a flowchart shown in FIG. 15. In FIG. 15, processes in Step S301 to Step S303 are same as those in Step S101 to Step S103 provided in FIG. 2 and descriptions of them are omitted accordingly. In Step S303, when first image feature information is extracted by the image feature information extracting section 102, the encryption key generating section 111 produces the encryption key from the first image feature information of each of the blocks. More particularly, a partial key is produced from each block and the partial key corresponding all or a part of the block is united to be used finally as an encryption key. In the second embodiment, a spectrum average is used for 4 frequency regions A to D in the image feature information as shown in FIG. 7 and P(N, A), P(N, B), P(N, C), and P(N, D) are assigned as each value of the image features A to D in the block number N. The partial key produced from the block N is set as K(N)=H(P(N, A), P(N, B), P(N, C), and P(N, D). Here, H(A, B, C, and D) is a function using values of image features A to D as an input parameter and Hash function or a like may be used as this function. Moreover, a final encryption key is represented by CK=F(K(1), K(2), . . . , K(n−1), K(n)) (n is a number of blocks). F is a function using each partial key K(1)-K(n) as an input parameter.

Next, the hidden information encrypting section 112 obtains specified hidden information from the hidden information storing section 110 (Step S305) and encrypts the hidden information using the encryption key produced by the encryption key generating section 111 at Step S304 (Step S306). In the embodiment, a symmetric encryption method in which a same key is used for encryption and decryption is used, however, a general common key encryption method may be employed or an encryption method in which a partition position of a dot pattern is hidden may be used. After hidden information has been encrypted by the hidden information encrypting section 112, the cryptograph block embedding section 113 visually represents the encrypted sentence by a barcode, pattern block described in the first embodiment or a like and inserts it into blank portion in the document image (Step S307). Then, the document image output section 114 prints and outputs the document image described above (Step S308). The printed documents 1a is visually same as that shown in FIG. 9.

Figure 16:
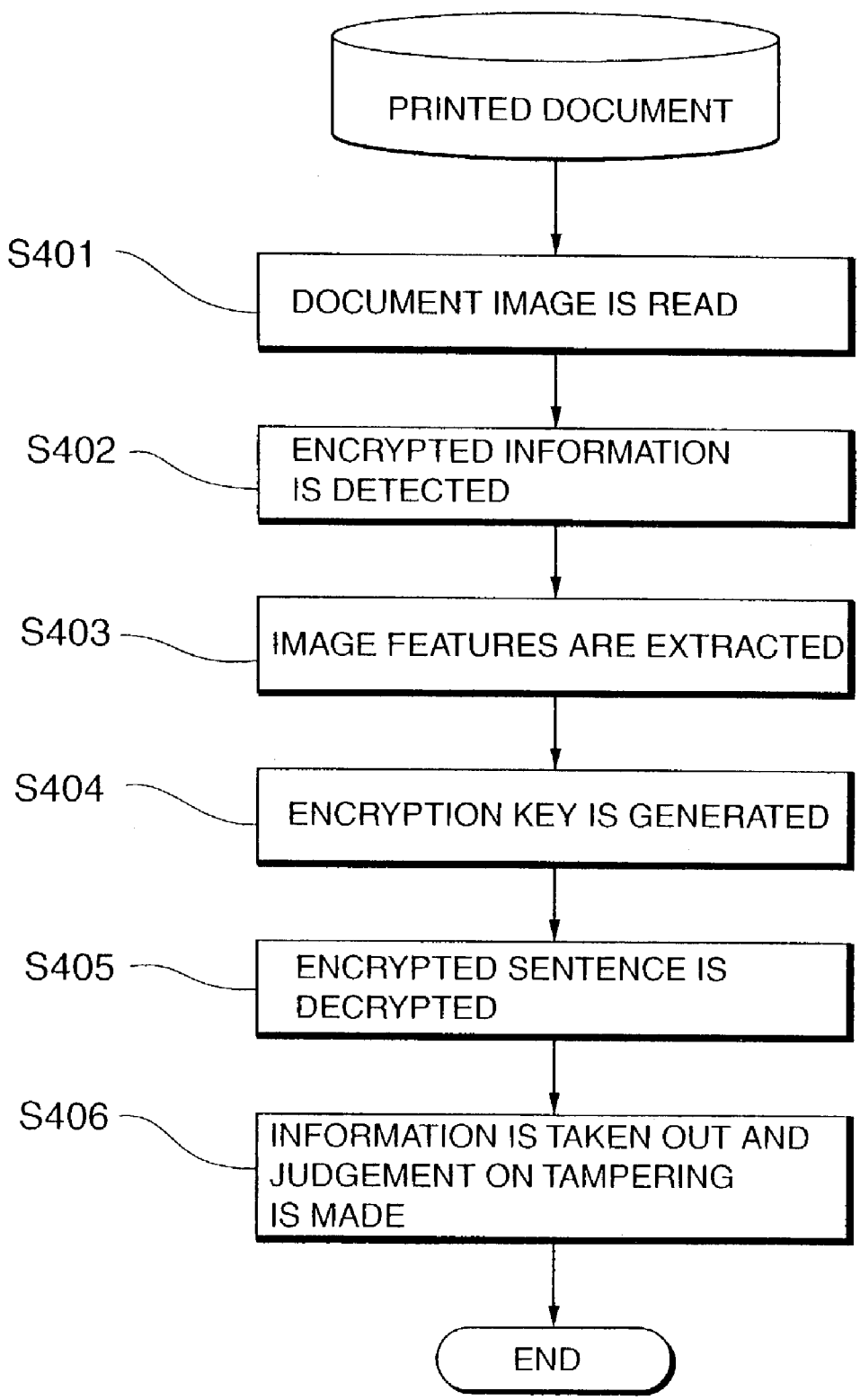
FIG. 16 is a flowchart showing operations of a tampering judgement system of the second embodiment of the present invention.

Next, operations of the tampering judgement device 200a are described by referring to a flowchart shown in FIG. 16. The tampering judgement device 200a first reads the printed document 1a being an object of judgement on tampering by the document image reading section 201 and develops the read document 1a as image data on a memory of a computer (Step S401). Processing performed at Step S401 is same as that at Step S201 provided in the first embodiment. The encryption information extracting section 211 allocates a portion corresponding to encrypted information from the image data and reconstructs it to be encrypted information (S402). When the pattern block is produced at Step S303, by performing the processing in retrograde order, encrypted sentence can be decrypted.

Moreover, the image feature information extracting section 203 detects image feature information by performing same processing as performed at Step S302 and S303 by the image feature information extracting section 102 on an image obtained by masking an encrypted information portion by the background region (Step S403). Next, the encryption key generating section 210 generates an encryption key by performing same processing as the encryption key generating section 111 (Step S404). The hidden information decoding section 212 performs decoding process on encrypted information extracted by the encryption information extracting section 211 using the encryption key generated by the encryption key generating section 210 and feeds a result from the decoding process to, for example, an operator using a screen display (Step S406). If specified signed information being proper hidden information is obtained from a result from the decrypting processing, the printed document 1a is judged to have not been tampered and, if proper signed information is not obtained, the printed document 1a is judged to have been tampered. That is, if the printed document 1a has not been tampered, since a second encryption key to be used for decryption becomes same as a first encryption key used for encryption, proper signed information is obtained. However, if encrypted information is not properly decrypted, it means that the second encrypted key is different from the first encrypted key and the printed document 1a is judged to have been tampered.

According to the encrypting system of the second embodiment, since hidden information is encrypted using image feature information of a document as an encryption key and since the encrypted information is embedded into the document, whether or not the document has been tampered can be checked and confirmed based on a result from decryption of the embedded encrypted information. Moreover, by using signed information as hidden information, simultaneous checking and confirming of both the sign and printed content can be done.

It is apparent that the present invention is not limited to the above embodiments but may be changed and modified without departing from the scope and spirit of the invention. For example, in the above embodiments, original image feature information or encrypted information is printed as a pattern block on a document so as to obtain visual a result. However, for example, a magnetic stripe portion may be provided on a printed document and original image feature information or encrypted information may be stored on a magnetic stripe as magnetic data. In this case, judgement on tampering may be made by mounting a reading unit of magnetic data on a side of the tampering judgement device.

What is claimed is:

1. An encrypting system for judging whether or not a content of a specified document has been tampered comprising:

a document/image output device having a first original image feature information extracting section to divide an original document image of an original document into a plurality of original blocks and to respectively extract original image feature information from the plurality of original blocks, a first encryption key generating section to generate a first encryption key from the extracted original image feature information, a hidden information encrypting section to encrypt specified hidden information using the generated first encryption key, an encrypted information adding section to add the encrypted hidden information to said original document image, and an output section to output said original document image to which said encrypted hidden information has been added; and a decoding device having an image reading section to read an image including a current document image of a current document and the encrypted hidden information, an encrypted information extracting section to divide the current document image into a plurality of current blocks to correspond to the plurality of original blocks and to respectively extract said encrypted hidden information from the current document, a second image feature information extracting section to extract second image feature information representing current features of an image from the current document, a second encryption key generating section to generate a second encryption key from the extracted second image feature information, and a decoding section to perform decoding processing on said extracted hidden information and the current features using the generated second encryption key.

2. The encrypting system according to claim 1, wherein said encrypted hidden information is able to be optically read.

3. The encrypting system according to claim 1, wherein the original image feature information represents an original feature data corresponding to one of the plurality of original blocks.

4. The encrypting system according to claim 1, wherein the image feature pattern is printed on a background region of the original document image where no characters exist.

* * * * *